United States Patent [19]

Craven, Jr. et al.

[11] Patent Number: 5,441,226
[45] Date of Patent: Aug. 15, 1995

[54] WINDOW MOUNTING BRACKET

[75] Inventors: Joseph B. Craven, Jr., Columbus; Floyd A. Collins, Fortson, both of Ga.

[73] Assignee: W. C. Bradley Company, Columbus, Ga.

[21] Appl. No.: 106,139

[22] Filed: Aug. 13, 1993

[51] Int. Cl.[6] .............................................. A47B 96/06
[52] U.S. Cl. ................................... 248/231.8; 126/200
[58] Field of Search ..................... 248/231.8; 126/198, 126/200, 202, 41 R

[56] References Cited

U.S. PATENT DOCUMENTS

| | | | |
|---|---|---|---|
| 3,996,710 | 12/1976 | Nuss | 126/200 X |
| 4,023,554 | 5/1977 | Katona | 126/200 X |
| 4,253,286 | 3/1981 | Katona | 126/198 X |
| 4,716,884 | 1/1988 | Bonaccorsi | 126/200 X |
| 4,729,364 | 3/1988 | Dailey | 126/41 R |
| 5,088,470 | 2/1992 | James | 126/41 R |

FOREIGN PATENT DOCUMENTS 761251 11/1956 United Kingdom ................ 126/200

*Primary Examiner*—J. Franklin Foss
*Attorney, Agent, or Firm*—Hopkins & Thomas; James W. Kayden

[57] ABSTRACT

A bracket member for use in mounting a window in a barbecue grill hood is disclosed, the bracket having a channel for receiving an edge of the window and spring clips which grip the window prior to installation and which are bent to engage the grill hood and secure the window and bracket to the grill hood.

15 Claims, 2 Drawing Sheets

WINDOW MOUNTING BRACKET

Many outdoor barbecue grills currently being produced are supplied with a front window so that the user can observe the food being cooked. The upper casting or hood of the grill is typically produced with a rectangular window opening which receives and mounts the glass window. As barbecue grills generate a considerable amount of heat, certain safety precautions and features are necessary when using glass windows. The glass frame must not rigidly hold the window as the glass must be able to freely expand and contract during the heating and cooling cycles. The frame must also not point load the glass to avoid stress concentrations that could cause cracking of the window.

The window frames or brackets supplied with the barbecue grill thus were loosely fitted around the glass and, typically, bolted to the grill hood. The loose fit makes installation difficult as the assembly must be held together while it is being put in place and there is a tendency for the loose members to slip off the glass. Each window frame was also model-specific to fit the different sized windows used for different sized castings or grill hoods. As the window frames or brackets were and are normally furnished in an unassembled condition, the manufacturer has to supply and stock a wide range and number of sizes and lengths of window-receiving channels, brackets, and fasteners, with different combinations being used on the various grill models. It is thus believed evident that a need exists in the art for a window bracket that provides the requisite safety features while simplifying the installation, manufacture, and provision of the bracket.

SUMMARY OF THE INVENTION

It is, therefore, one of the principal objects of the present invention to provide a window bracket that can be universally applied to all past and present barbecue grill windows and which securely mounts the window in the grill hood while allowing the glass to expand and contract as necessary.

Another object of the present invention is to simplify the manufacture and stocking of window brackets used for holding windows in barbecue grills by reducing the number of required parts from a relatively large number to one.

A further object of the present invention is to simplify the installation of the windows by the consumer as only a single bracket member is required, the bracket member being configured to hold itself in place during the installation.

A still further object of the present invention is to provide a safer and more effective method of mounting and, if necessary, removing a window of a barbecue grill or wherever the window is mounted, and to provide a window bracket that is economical to produce and durable to provide a long service life.

These and other objects are attained by the present invention which relates to a window bracket whose principal use is mounting a window in a barbecue grill or other cooking appliance. The bracket includes channel means for receiving the glass window and fastening means for securing the window and bracket assembly to the grill casting. The bracket may also include tab means for conveniently locating and temporarily seating the assembly in the casting. The present bracket is normally fabricated from a heat-resistant material, such as aluminum or other suitable metal, and can be economically produced in a stamping operation or the like.

Various additional objects and advantages of the present invention will become apparent from the following detailed description, with reference to the accompanying drawings.

DETAILED DESCRIPTION OF THE PREFERRED EMBODIMENT

Figure 1:
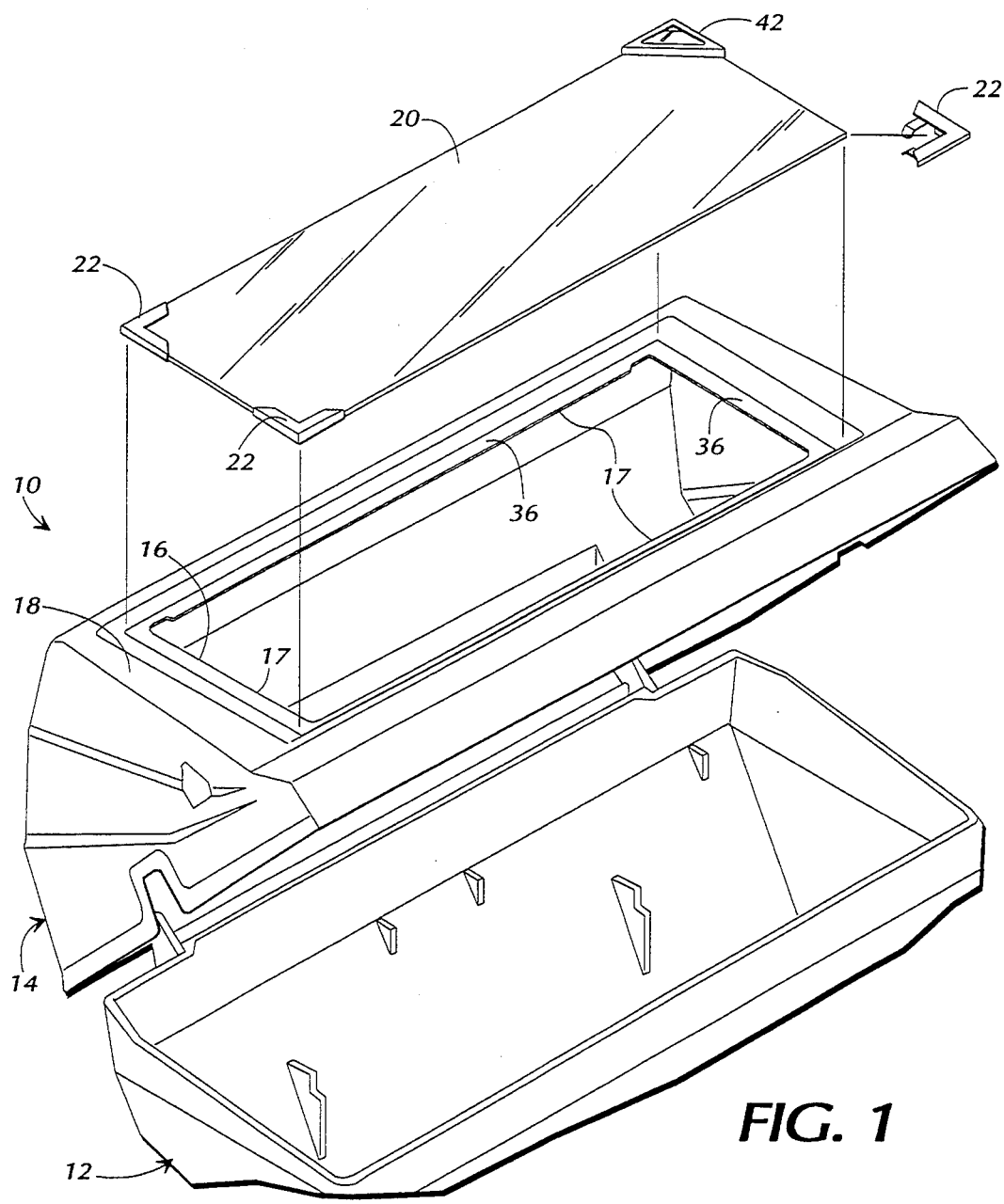
FIG. 1 is a partial, exploded perspective view of a barbecue grill hood and firebox, illustrating the relationship between the present window bracket, window and grill.

Referring now more specifically to the drawings, and to FIG. 1 in particular, numeral 10 designates generally a barbecue grill having a bottom casting or firebox 12 and a top casting or hood 14. The hood is formed with an opening 16 defined by edges 17 in the front wall 18 thereof, into which a window 20 is normally installed. As noted hereinabove, a prior art window mounting normally requires a plurality of different sized window frame members, holes in the top casting, and fasteners such as bolts and nuts to secure the window/frame assembly to the casting. As will be apparent from FIG. 1, the present invention provides a novel and innovative change from the prior art.

With the present invention, the window 20 is mounted in the grill hood front opening using a unique bracket member 22. Broadly speaking, the bracket includes a channel means for receiving a portion of the window and fastening means for securing the bracket member and window assembly to the grill hood. The fastening means doubles as a holding means for maintaining the bracket member in place on the window prior to and during installation. The invention may also be described in terms of a device for mounting a flat sheet of material over an opening in a body of a grill or the like.

Figure 2:
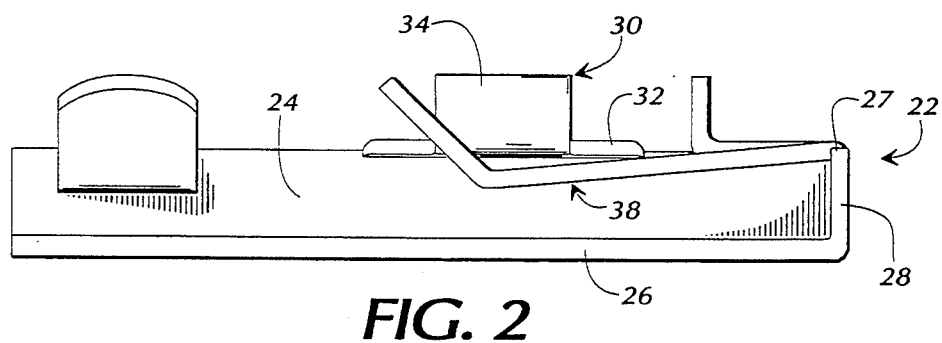
FIG. 2 is an enlarged, side elevational view of the present bracket.

The bracket member 22 is shown in detail in FIG. 2. A channel means 24 is defined by a front wall 26 and a depending portion or end wall 28. The front wall comprises a substantially flat member adapted to overlay the glass or sheet material. The front and end walls are normally disposed perpendicular to one another with the width of the channel thus provided being slightly greater than the width of the edge of the window glass. For a corner bracket member, as shown in FIGS. 1 through 6, the front wall 26 and end wall 28 are L-shaped and extend continuously through a ninety degree (90°) angle so as to bear against and frame the corner of the window.

Figure 4:
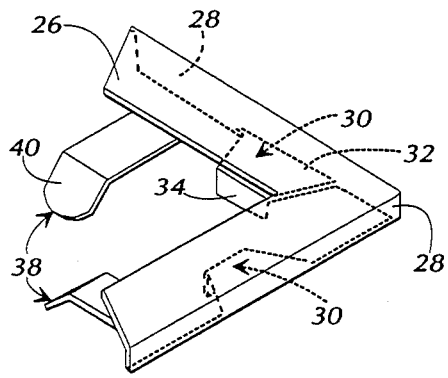
FIG. 4 is a perspective view of the present bracket.
Figure 5:
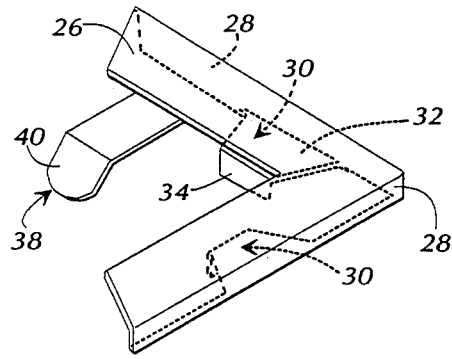
FIG. 5 is a perspective view of an alternate embodiment of the present invention.
Figure 6:
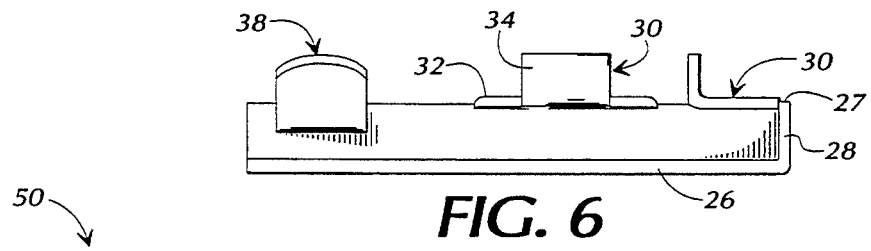
FIG. 6 is a side elevational view of the bracket shown in the preceding figure.
Figure 7:
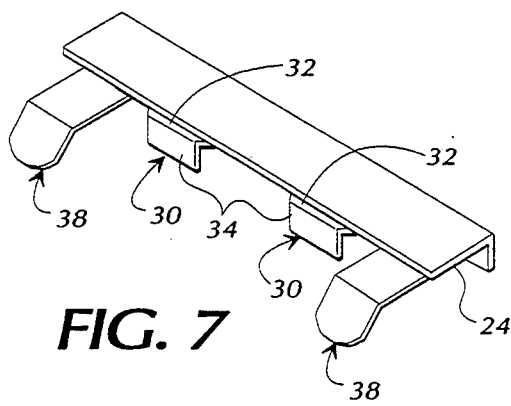
FIG. 7 is a perspective view of another embodiment of the present invention.

Additional securement for the window is provided by locator tabs 30 which extend inwardly from the distal edge 27 of the end walls 28. These tabs are designed to partially form the rear portion of the channel 24 and are disposed at spaced intervals as best shown in FIGS. 4, 5, and 7. Tabs 30 are L-shaped, having a rear wall portion 32 which extends perpendicularly from the end wall 28 and parallel to the side walls 26, thus completing the framing of the window. Extending perpendicularly inward toward the grill hood from wall portions 32 are flanges 34 which bear against the edges of the opening 16 in the grill hood, thus locating and centering the window assembly in the opening. The locator tabs may not be required in all applications, for example where a rear wall to complete the channel is incorporated into the grill hood. This type of design is shown in FIG. 1 by rear wall portion 36 which substantially frames the window opening 16. The window or sheet material is also capable of being held in place solely by the front and end walls and the fastening means 38 which are described in detail below.

Fastening means for securing the window bracket assembly in the grill hood are provided in the form of spring clips 38 which are connected to and extend inwardly from the end walls 28, generally parallel with the front wall. As best shown in FIG. 2, the spring clips are biased inwardly toward the channel 24 in order to hold the bracket member on the window as the window is being moved into place for installation. The clips are elongated and flexible and thus are easily deflected for installation on the window. When placed on the window, the spring fit ensures that the brackets remain in position.

Figure 3:
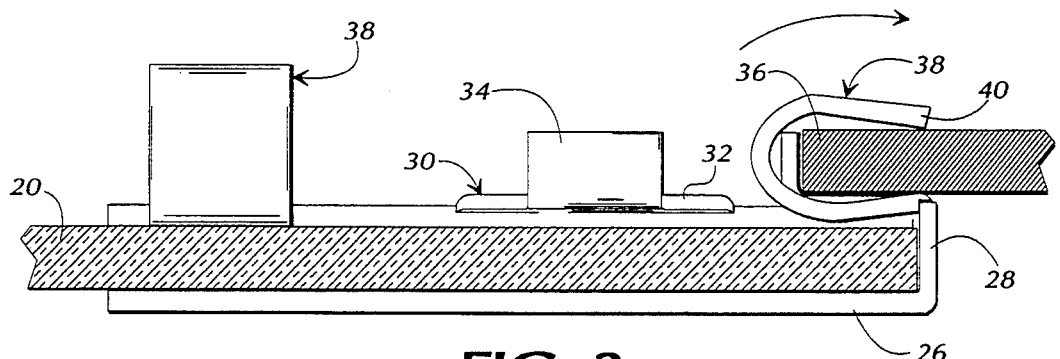
FIG. 3 is an enlarged, side elevational view of the bracket and window in an installed position.

When the glass is installed into the grill hood, the spring clips 38 are bent away from the window and toward an adjacent portion of the grill hood, as best shown in FIG. 3. This secures the window assembly to the grill hood or casting and releases the spring fit on the window to allow the glass to freely expand and contract during heating and cooling thereof. The outer ends 40 of the spring clips are angled outwardly with respect to the front walls of the bracket. This facilitates bending the clip and causes the end of the clip to come into contact with the grill hood sooner than would a linear member with the same function.

With at least one spring clip per bracket at each corner of the window, the window is quickly, easily, and securely mounted in the grill hood. An embodiment having two spring clips is shown in FIG. 4. An embodiment having a single clip is shown in FIG. 5. In addition, as noted hereinabove, the present bracket may be produced without the locator tabs 30.

Figure 8:
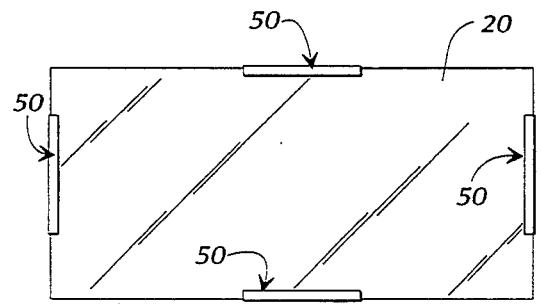
FIG. 8 is a front elevational view of the alternate embodiment shown in the preceding figure in installed position around a window.

FIGS. 7 and 8 illustrate another alternate embodiment in which the bracket member 50 is produced in a linear configuration. The bracket member has the same basic structure and function as the previously disclosed embodiments and thus the reference numerals have remained the same for ease of description. As shown in FIG. 8, an embodiment with this design can be installed on the linear edges of the window.

To remove the window in case of accidental breakage or to clean the window, the spring clips are bent back toward their initial position, whereupon the window and bracket assembly are lifted out of the hood. Re-installation is as described above.

In a further application of the present invention, one or more spring clips can be used to secure a heat indicator 42 to the grill window. This is shown in the upper left corner of FIG. 1. The locator tabs are optional, as with the other embodiments described herein.

Thus, while an embodiment of a window mounting bracket and modifications thereof have been shown and described in detail herein, various additional changes and modifications can be made without departing from the scope of the present invention.

We claim:

1. A window mounting bracket for use in installing a window in an opening in a barbecue grill hood or the like, said bracket comprising channel means for receiving an edge of the window and fastening means for securing said bracket in the opening, said fastening means having a first position biased against the window and a second position biased against the grill hood or the like.

2. A bracket as defined in claim 1 in which said fastening means comprise flexible spring clips.

3. A bracket as defined in claim 1 in which said channel means is defined by a front wall and an end wall, said front and end walls being disposed substantially perpendicular to one another.

4. A bracket as defined in claim 1 and including locator tabs for centering said window in the opening and for forming a portion of said channel means.

5. A window mounting bracket for installing a window in a barbecue grill hoods the hood having an opening formed in a wall thereof which is defined by peripheral edges, said bracket comprising channel means for receiving and holding at least a portion of the window, and at least one spring clip having a first position in gripping relationship with the window and a second position spaced from said window and in secured engagement with the peripheral edges defining the opening in the grill hood.

6. A window mounting bracket as defined in claim 5 in which said bracket includes a plurality of spring clips.

7. A window mounting bracket as defined in claim 5 in which said bracket includes tab means for engaging the peripheral edges of the opening in the grill hood and centering the window in the opening.

8. A window mounting bracket as defined in claim 5 in which said channel means is formed with a ninety degree angle therein for receiving a corner of the window.

9. A method of installing a window in an opening formed in a barbecue grill hood using bracket members having a channel for receiving and holding an edge of the window and securing means for fastening the bracket members and window to the grill hood, wherein the method comprises the steps of
 a) attaching a bracket member at spaced intervals around the window;
 b) placing the window with the attached bracket members into the grill hood opening; and
 c) bending said securing means into engagement with the grill hood.

10. A device for mounting a flat sheet of material over an opening in a body wherein the body has edges defining the opening, said device comprising:
 a substantially flat member adapted to overly the sheet material along an edge thereof, said flat member having a depending portion along one edge, said depending portion having a distal edge and being adapted to bear against the edge of the sheet material; and
 means for mounting said flat member to the body comprising at least one clip member extending from said distal edge substantially parallel to said flat member, wherein said clip member is deformable to grasp the edge of the opening.

11. A device as defined in claim 10 in which said flat member is L-shaped.

12. A window and bracket assembly for a barbecue grill, said grill having a hood with means defining an opening for receiving a window, said assembly comprising a window bracket members disposed at spaced intervals around said window, said bracket members having a channel for receiving and holding an edge of said window, and securing means for fastening said bracket members and window to the grill hood, wherein said securing means have a first position in engagement with the window for holding said brackets on the window and a second position in engagement with the grill hood for holding said assembly in the opening in the grill hood.

13. A window and bracket assembly for a barbecue grill, said grill having a hood with means defining an opening tier receiving a window, said assembly comprising a window bracket members disposed at spaced intervals around said window, said bracket members having a channel for receiving and holding an edge of said window, and securing means for fastening said bracket members and window to the grill hood, wherein one of said brackets is disposed at each corner of the window.

14. A window and bracket assembly for a barbecue grill, said grill having a hood with means defining an opening for receiving a window, said assembly comprising a window bracket members disposed at spaced intervals around said window, said bracket members having a channel for receiving and holding an edge of said window, and securing means for fastening said bracket members and window to the grill hood, wherein one of said brackets is disposed intermediate each corner of the window.

15. A window and bracket assembly for a barbecue grill, said grill having a hood with means defining an opening for receiving a window, said assembly comprising a window bracket members disposed at spaced intervals around said window, said bracket members having a channel for receiving and holding an edge of said window, and securing means for fastening said bracket members and window to the grill hood, wherein said bracket members include tab means for forming a portion of said channel.

* * * * *

UNITED STATES PATENT AND TRADEMARK OFFICE
CERTIFICATE OF CORRECTION

PATENT NO. : 5,441,226
DATED : August 15, 1995
INVENTOR(S) : Craven *et al.*

It is certified that error appears in the above-indentified patent and that said Letters Patent is hereby corrected as shown below:

In column 4, line 27 – "hoods" is corrected to "hood,".

In column 4, line 52 – "a bracket member" is corrected to "the bracket members".

In column 4, line 61 – "overly" is corrected to "overlay".

In column 5, line 21 – "tier" is corrected to "for".

In column 5, line 21-22 – "comprising a" is corrected to "comprising".

In column 6, line 2 – "said brackets" is corrected to "said bracket members".

In column 6, line 7 – "a window bracket" is corrected to "window bracket".

In column 6, line 12 – "said brackets" is corrected to "said bracket members".

UNITED STATES PATENT AND TRADEMARK OFFICE
CERTIFICATE OF CORRECTION

PATENT NO. : 5,441,226

DATED : August 15, 1995

INVENTOR(S) : Craven et al.

It is certified that error appears in the above-indentified patent and that said Letters Patent is hereby corrected as shown below:

In column 6, lines 16-17 – "comprising a window" is corrected to "comprising window".

Signed and Sealed this

Eighteenth Day of August, 1998

Attest:

BRUCE LEHMAN

Attesting Officer

Commissioner of Patents and Trademarks

(12) EX PARTE REEXAMINATION CERTIFICATE (4848th)
United States Patent
Craven, Jr. et al.

(10) Number: US 5,441,226 C1
(45) Certificate Issued: Sep. 23, 2003

(54) WINDOW MOUNTING BRACKET

(75) Inventors: Joseph B. Craven, Jr., Columbus, GA (US); Floyd A. Collins, Fortson, GA (US)

(73) Assignee: W. C. Bradley Company, Columbus, GA (US)

Reexamination Request:
No. 90/005,399, Jun. 17, 1999

Reexamination Certificate for:
Patent No.: 5,441,226
Issued: Aug. 15, 1995
Appl. No.: 08/106,139
Filed: Aug. 13, 1993

Certificate of Correction issued Aug. 18, 1998.

(51) Int. Cl.[7] .................... A47B 96/06; F24C 15/04
(52) U.S. Cl. .................... 248/231.81; 126/200
(58) Field of Search .................... 248/231.81; 126/200, 126/198, 202, 41 R

(56) References Cited

PUBLICATIONS

Char–Broil Outdoor Gas Grill Assembly Instructions and Parts List—1985 Brochure (Bradley's 1985 Manual 2066) (Exhibit C1).
Char–Broil Assembly Instructions Model 6229 Gas Grill—1992 Brochure ("Bradley's 1992 Manual 6229") (Exhibit C2).
Char–Broil Assembly Instructions for Model 8334—1992 Brochure ("Bradley's 1992 Manual 8334") (Exhibit C3).
Sunbeam Portable Propane Grill Model 85222—1992 Brochure ("Sunbeam's 1992 Manual 85222") (Exhibit C4).

*Primary Examiner*—Anita M. King

(57) ABSTRACT

A bracket member for use in mounting a window in a barbecue grill hood is disclosed, the bracket having a channel for receiving an edge of the window and spring clips which grip the window prior to installation and which are bent to engage the grill hood and secure the window and bracket to the grill hood.

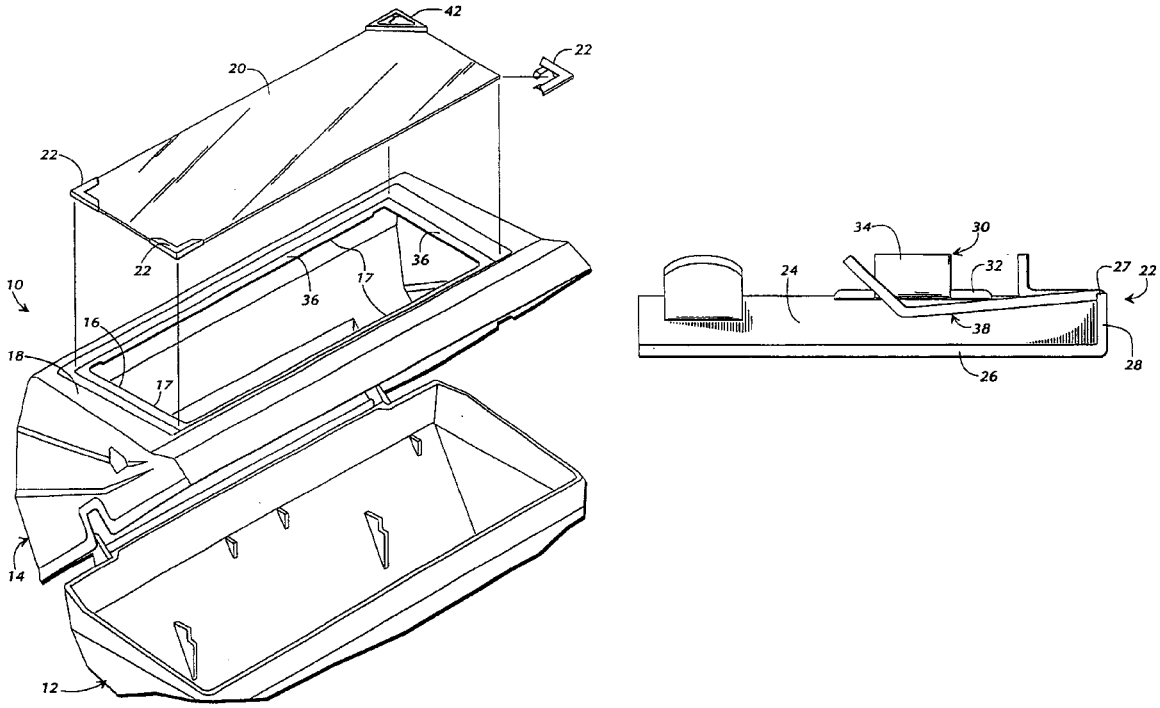

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–8 and 10–15 is confirmed.

Claim 9 is cancelled.

New claims 16 and 17 are added and determined to be patentable.

*16. A window and bracket assembly for a barbecue grill, said grill having a hood with means defining an opening for receiving a window, said window and bracket assembly comprising:*

*a window; and*

*window bracket members disposed at spaced intervals around said window, said window bracket members having a channel for receiving and holding an edge of said window, and at least one bendable clip for fastening said bracket members and window to the grill hood, wherein one of the said window bracket members is disposes at each corner of said window.*

*17. A barbecue grill having a hood with an opening in the hood, said grill having a window assembly, said window assembly comprising:*

*a window; and*

*corner window brackets having a channel for supporting said window at an edge of said window and a bendable clip for securing said corner window brackets and said window to the grill hood,*

*wherein said corner window brackets are positioned along an edge of said window such that a substantial portion of said window edge is exposed.*

\* \* \* \* \*